United States Patent
Ichihara

(10) Patent No.: US 10,683,069 B2
(45) Date of Patent: Jun. 16, 2020

(54) UNDERWATER EXPLORATION SYSTEM

(71) Applicant: PRODRONE CO., LTD., Nagoya-shi, Aichi (JP)

(72) Inventor: Kazuo Ichihara, Nagoya (JP)

(73) Assignee: PRODRONE CO., LTD., Nagoya (JP)

(*) Notice: Subject to any disclaimer, the term of this patent is extended or adjusted under 35 U.S.C. 154(b) by 250 days.

(21) Appl. No.: 15/780,652

(22) PCT Filed: Nov. 28, 2016

(86) PCT No.: PCT/JP2016/085089
§ 371 (c)(1),
(2) Date: Jun. 1, 2018

(87) PCT Pub. No.: WO2017/094635
PCT Pub. Date: Jun. 8, 2017

(65) Prior Publication Data
US 2018/0370604 A1    Dec. 27, 2018

(30) Foreign Application Priority Data
Dec. 1, 2015  (JP) ................... 2015-234999

(51) Int. Cl.
*B63C 9/01*  (2006.01)
*B64C 39/02*  (2006.01)
(Continued)

(52) U.S. Cl.
CPC .............. *B63C 11/48* (2013.01); *B63B 22/12* (2013.01); *B63C 9/01* (2013.01); *B63G 8/001* (2013.01);
(Continued)

(58) Field of Classification Search
CPC ................ B63C 9/01; B63G 2008/007; B64C 2201/128
See application file for complete search history.

(56) References Cited

U.S. PATENT DOCUMENTS

| 4,124,181 A | 11/1978 | Kolwey |
| 4,447,083 A | 5/1984 | Campana et al. |

(Continued)

FOREIGN PATENT DOCUMENTS

| JP | H03-12508 U | 2/1991 |
| JP | H05-293789 A | 11/1993 |

(Continued)

OTHER PUBLICATIONS

Feb. 14, 2017 International Search Report issued in Patent Application No. PCT/JP2016/085089.

(Continued)

*Primary Examiner* — Brian M O'Hara
(74) *Attorney, Agent, or Firm* — Oliff PLC

(57) ABSTRACT

An underwater exploration system enables signal transmission and reception to and from an underwater vehicle through wireless communication, that enables carriage of the underwater vehicle to a survey point and collection of the underwater vehicle, and, further, that enables a quick change of the survey point. The underwater exploration system includes: an underwater exploration unit including: a floating member including a first antenna and configured to support the first antenna above a water surface; and an underwater vehicle connected to the first antenna via a signal line; a communication device including a second antenna configured to transmit and receive a wireless signal to and from the first antenna; and an unmanned aerial vehicle configured to carry the underwater exploration unit and drop the underwater exploration unit to the water surface.

11 Claims, 7 Drawing Sheets

(51) Int. Cl.
*B63C 11/48* (2006.01)
*B63G 8/00* (2006.01)
*B63B 22/12* (2006.01)
*B64C 27/08* (2006.01)

(52) U.S. Cl.
CPC ............ *B64C 39/02* (2013.01); *B64C 39/024* (2013.01); *B63B 2203/00* (2013.01); *B63B 2211/02* (2013.01); *B63G 2008/007* (2013.01); *B64C 27/08* (2013.01); *B64C 2201/027* (2013.01); *B64C 2201/141* (2013.01)

(56) References Cited

U.S. PATENT DOCUMENTS

| | | | |
|---|---|---|---|
| 4,884,769 A | 12/1989 | Snead | |
| 6,536,743 B2* | 3/2003 | Selcer | B63B 21/66 |
| | | | 254/333 |
| 8,056,461 B2* | 11/2011 | Bossert | F41F 3/07 |
| | | | 114/316 |
| 9,745,062 B2* | 8/2017 | Richardson | B64D 1/02 |
| 10,173,774 B2* | 1/2019 | Jones | B64C 37/02 |
| 10,301,020 B2* | 5/2019 | Jones | B64C 39/024 |
| 2014/0111332 A1 | 4/2014 | Przybylko et al. | |
| 2016/0059963 A1* | 3/2016 | Burgess | B64D 1/12 |
| | | | 701/49 |
| 2019/0202530 A1* | 7/2019 | Rikoski | B63B 22/02 |

FOREIGN PATENT DOCUMENTS

| | | |
|---|---|---|
| JP | 2009-051470 A | 3/2009 |
| JP | 2014-097785 A | 5/2014 |

OTHER PUBLICATIONS

Aug. 8, 2017 International Preliminary Report on Patentability issued in Patent Application No. PCT/JP2016/085089.

* cited by examiner

UNDERWATER EXPLORATION SYSTEM

TECHNICAL FIELD

The present invention relates to an underwater exploration system. More specifically, the present invention relates to an underwater exploration system that uses an unmanned aerial vehicle to drop and collect a wirelessly communicable underwater vehicle.

BACKGROUND ART

Conventionally, in surveys of underwater states using an unmanned underwater vehicle submerged underwater, it has been necessary to move the underwater vehicle on a mother ship to the vicinity of a survey point and lift down the underwater vehicle, or to cause the unmanned underwater vehicle to travel by itself from a waterside location to the survey point. Moreover, since radio waves attenuate significantly underwater, it is common practice to use wired communication to transmit and receive signals to and from the underwater vehicle.

Conventionally, small-size unmanned aerial vehicles (UAVs) represented by industrial unmanned helicopters have been difficult to obtain due to their expensive airframes. Moreover, stable flight of unmanned aerial vehicles requires skillful operations. In recent years, however, airframe components such as acceleration sensors and angular velocity sensors have been improved in performance and lowered in cost. Moreover, much of the operation for controlling the airframe has been automated, which has led to significant improvements in the operability of the airframe. In light of the circumstances, attempts are currently being made to expand the application of multi-copters, in particular small-size multi-copters, over and above recreational purposes, to various missions in a broad range of areas.

CITATION LIST

Patent Literature

PTL1: JP 2009-051470 A

SUMMARY OF INVENTION

Technical Problem

Patent literature 1 described above discloses an underwater vehicle remote control system that performs wireless communication between an underwater vehicle 1 and a command center 2. The underwater vehicle remote control system includes: a relay unit 4, which is made to float on the water surface by a floater 41; an antenna 43, which is supported above the water surface by the relay unit 4 and wirelessly communicates with the command center 2; and an underwater vehicle 1, which is connected to the relay unit 4 through an optical cable 3. The relay unit 4 serves as a relay that converts an optical signal and a wireless signal to and from each other to make the underwater vehicle 1 and the command center 2 wirelessly communicable with each other.

However, patent literature 1 described above does not recite means for carrying the underwater vehicle 1 to the survey point, and is silent on means for collecting the underwater vehicle 1. For example, if the underwater vehicle 1 is caused to travel by itself from the mother ship or the on-land command center 2 to the survey point, the underwater vehicle 1 needs to pull the relay unit 4 to the survey point, since the underwater vehicle 1 and the relay unit 4 are connected to each other through the optical cable 3. Consequently, if the survey point is far from the command center 2, the battery power and time are spent on the movement of the underwater vehicle 1, resulting in an inefficient survey. It is also possible to carry the underwater vehicle 1 to the vicinity of the survey point using another means of carriage such as a small craft. In this case, however, it is only necessary to lift down the underwater vehicle 1, which is connected to the optical cable 3, from the small craft. This makes wireless communication with the underwater vehicle 1 insignificant. With either the moving method or the carrying method, the underwater vehicle 1 needs to move to the survey point in the water or on the water. This makes it difficult to shorten the moving time and/or change the survey point flexibly.

In view of the above-described issue, a problem to be solved by the present invention is to provide an underwater exploration system that enables signal transmission and reception to and from an underwater vehicle through wireless communication, that enables carriage of the underwater vehicle to a survey point and collection of the underwater vehicle, and, further, that enables a quick change of the survey point.

Solution to Problem

In order to solve the above-described problem, the present invention provides an underwater exploration system including: an underwater exploration unit including: a floating member including a first antenna and configured to support the first antenna above a water surface; and an underwater vehicle connected to the first antenna via a signal line; a communication device including a second antenna configured to transmit and receive a wireless signal to and from the first antenna; and an unmanned aerial vehicle configured to carry the underwater exploration unit and drop the underwater exploration unit to the water surface.

The underwater vehicle is wiredly connected to the first antenna above the water surface. This enables the communication device to wirelessly communicate with the underwater vehicle via the first antenna. Moreover, the underwater vehicle is quickly carried to a survey point by the unmanned aerial vehicle. This ensures that the battery power and time consumed by the underwater vehicle are concentrated on an underwater survey, resulting in increased efficiency of the survey.

The unmanned aerial vehicle preferably includes: a plurality of propellers; and a controller configured to control a flight that is made using the plurality of propellers.

A rotorcraft is capable of flexibly changing its moving speed and direction. This facilitates dropping of the underwater vehicle precisely to the survey point, and facilitates the work of collecting the underwater vehicle. Moreover, the unmanned aerial vehicle is caused to fly autonomously by the controller. This ensures that the underwater vehicle is dropped and collected with more improved efficiency.

The floating member is preferably configured to inflate upon landing on water, turning the first antenna into a communicable state.

Reducing the volume of the underwater exploration unit facilitates loading of the underwater exploration unit onto the unmanned aerial vehicle. Moreover, it is after the floating member lands on water that the first antenna turns into a communicable state. This prevents the underwater vehicle from erroneously operating during carriage of the underwater vehicle.

Before the floating member inflates, the floating member is preferably in a folded state with the underwater vehicle wrapped inside the floating member.

The underwater vehicle is wrapped inside the floating member. This alleviates the shock on the underwater vehicle involved when the underwater vehicle lands on water, and prevents damage to the underwater vehicle caused by dropping.

After the underwater exploration unit lands on water, the first antenna preferably stands upward from the floating member. The unmanned aerial vehicle is preferably configured to make a collection member hung from an airframe of the unmanned aerial vehicle, the collection member being configured to capture the first antenna. The first antenna preferably has a strength high enough to support a weight of the underwater exploration unit.

After the underwater exploration unit lands on water, the first antenna is the uppermost component among the components of the underwater exploration unit. The unmanned aerial vehicle includes the collection member configured to capture the first antenna, and the first antenna has a strength high enough to support the weight of the underwater exploration unit. This facilitates collection of the underwater exploration unit.

The underwater exploration unit preferably includes means for transmitting current position information on the underwater exploration unit. The unmanned aerial vehicle is preferably configured to automatically approach the underwater exploration unit based on the current position information.

The underwater exploration unit is capable of transmitting current position information on the underwater exploration unit itself. This enables the unmanned aerial vehicle to automatically collect the underwater exploration unit.

Preferably, the underwater exploration system further includes a shock-absorbing facility to which the underwater exploration unit collected by the unmanned aerial vehicle is dropped.

The collected underwater exploration unit is dropped to the shock-absorbing facility. This mitigates the shock on the underwater exploration unit caused by dropping, and ensures that the underwater exploration unit is collected more safely.

Advantageous Effects of Invention

Thus, the underwater exploration system according to the present invention enables signal transmission and reception to and from an underwater vehicle through wireless communication, enables carriage of the underwater vehicle to a survey point and collection of the underwater vehicle, and further enables a quick change of the survey point.

DESCRIPTION OF EMBODIMENTS

Figure 1:
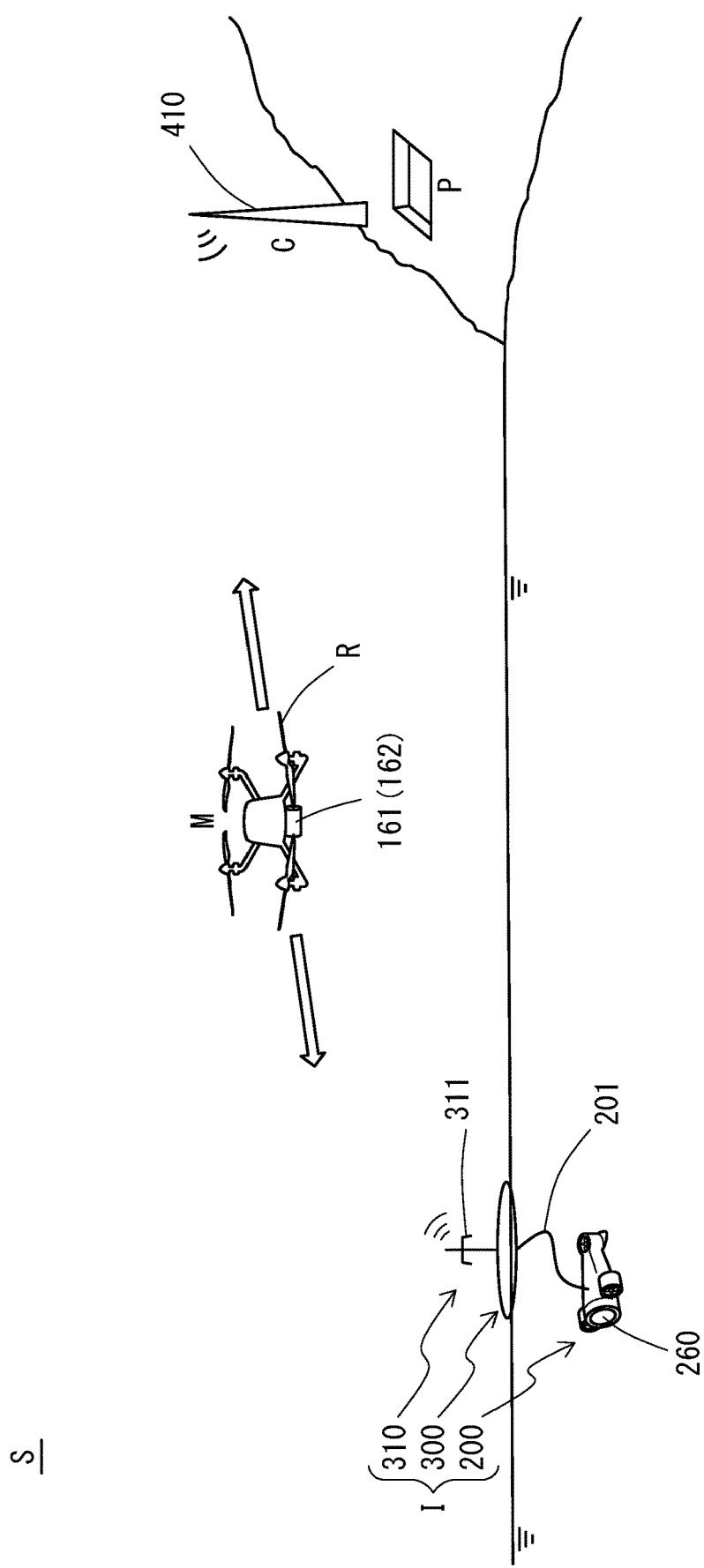
FIG. 1 is a schematic diagram illustrating an underwater exploration system that is taking an image under the sea.

An embodiment of an underwater exploration system according to the present invention will be described in detail below by referring to the drawings. The underwater exploration system according to the following embodiment uses a wireless aerial vehicle to carry an underwater vehicle from land to a predetermined survey point at sea and drop the underwater vehicle at the survey point. Then, the underwater exploration system takes an image of an underwater state at the survey point. It is noted that while the sea, lakes, rivers, reservoirs, water tanks, and pools are possible examples of the places where the underwater exploration system according to the present invention can be used, any other place is possible insofar as water (liquid) is stored in the place.

[General Arrangement]

FIG. 1 is a schematic diagram illustrating an underwater exploration system S according to this embodiment that is taking an image under the sea. The underwater exploration system S mainly includes a multi-copter M (unmanned aerial vehicle), an underwater exploration unit I, a command center C (communication device), and a collection pool P (shock-absorbing facility).

The underwater exploration unit I includes: a first antenna 310; a buoy 300 (floating member), which is capable of supporting the first antenna 310 above the sea surface; and an underwater vehicle 200, which is connected to the first antenna 310 via a signal line 201. The command center C includes a second antenna 410, which is capable of transmitting and receiving wireless signals to and from the first antenna 310. Through the wireless communication via the first antenna 310, the command center C transmits an operation command to the underwater vehicle 200 and receives data of moving images and/or still images taken under the sea by an underwater camera 260 of the underwater vehicle 200. The command center C then displays the data on a display device, not illustrated. The multi-copter M is carrying means that drops and collects the underwater exploration unit I by making a round trip between an airfield of the multi-copter M and a survey point at sea. (The airfield is located at the same place as the command center C in this embodiment. In the following description, the airfield of the multi-copter M will also be referred to as "command center C".)

[Configuration of Multi-Copter]

Figure 2:
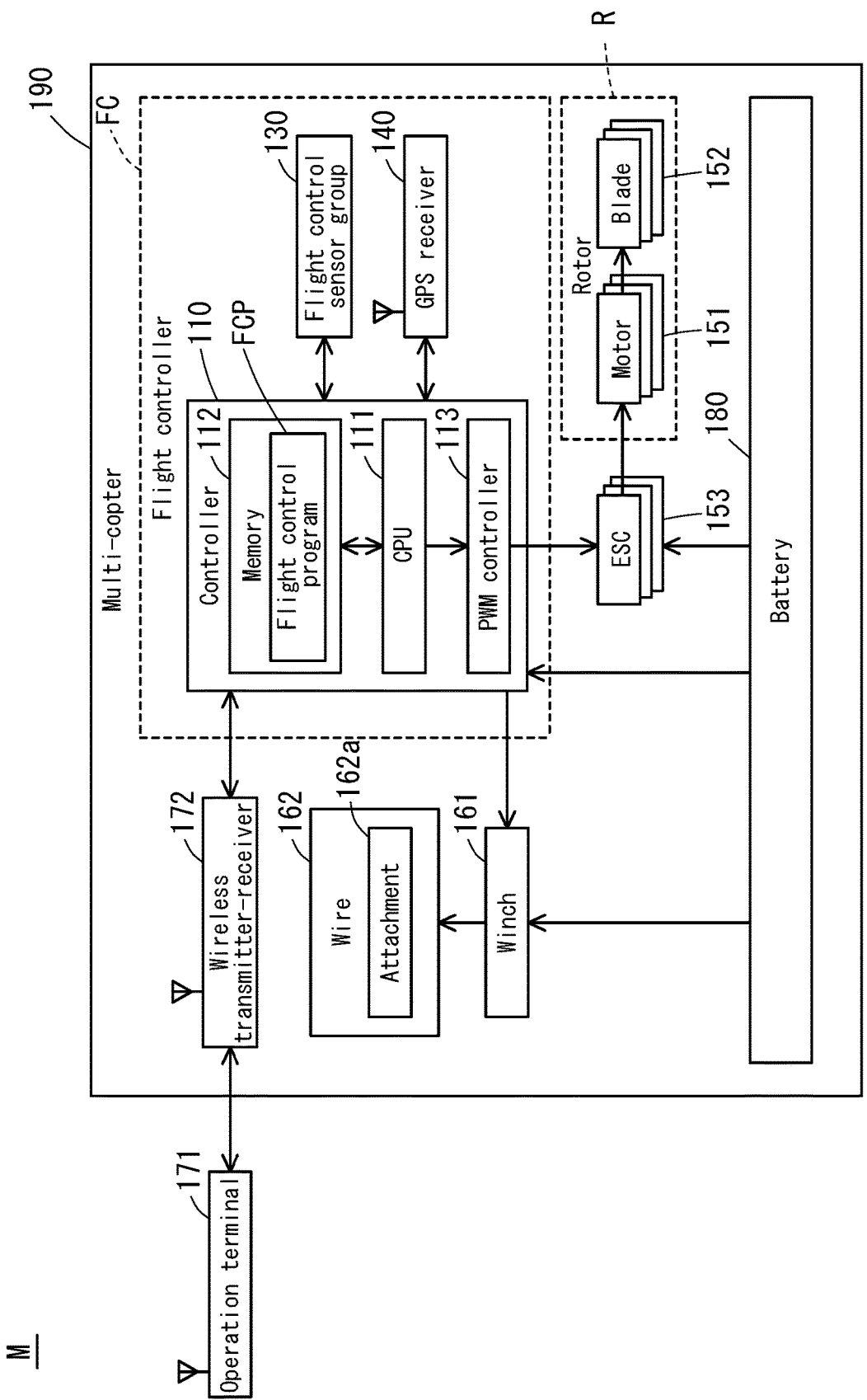
FIG. 2 is a block diagram illustrating a functional configuration of a multi-copter.

FIG. 2 is a block diagram illustrating a functional configuration of the multi-copter M according to this embodiment. The multi-copter M includes: a flight controller FC (controller); a plurality of rotors R (propellers); ESCs (Electric Speed Controllers) 153, each of which is dedicated to a corresponding one of the rotors R; a wireless transmitter-receiver 172, which wirelessly communicates with an operation terminal 171, which is operated by an operator; and a battery 180, which serves as a power supply source. The flight controller FC, the plurality of rotors R, the ESCs 153, the wireless transmitter-receiver 172, and the battery 180 are disposed in a housing 190.

Each rotor R includes: a motor 151, which is a DC motor; and a blade 152, which is attached to an output shaft of the motor 151. The ESCs 153 are devices that are each connected to a corresponding one of motors 151 of the rotors R and that cause the motors 151 to rotate at a speed instructed by the flight controller FC. It is noted that while the multi-copter M according to this embodiment is a quadcopter, which is equipped with four rotors R, the number of rotors R is not limited to four. Depending on the required flight stability and/or depending on how much cost is acceptable, the multi-copter M is changeable as desired to: a helicopter, with two rotors R; an octocopter, with eight rotors R; or even a multi-copter with some more rotors R.

The flight controller FC includes a controller 110, which is a micro-controller. The controller 110 includes: a CPU iii, which is a central processing unit; a memory 112, which is a storage device such as ROM and RAM; and a PWM controller 113, which controls the number of rotations and the rotational speed of each of the motors 151 through the ESCs 153.

The flight controller FC also includes a flight control sensor group 130 and a GPS receiver 140 (hereinafter also referred to as "sensors and related devices"). The flight control sensor group 130 and the GPS receiver 140 are connected to the controller 110. The flight control sensor group 130 of the multi-copter M according to this embodiment includes an acceleration sensor, an angular velocity sensor, a pneumatic sensor (altitude sensor), and a geomagnetic sensor (direction sensor). These sensors and related devices enable the controller 110 to obtain position information on the multi-copter M that includes, in addition to the inclination and rotation of the airframe, latitude, longitude, and altitude, and the azimuth of the head of the airframe during a flight. The multi-copter M according to this embodiment is assumed to obtain the flight altitude using a pneumatic sensor. It is also possible to obtain the flight altitude by, for example, directing a distance measuring sensor toward the ground surface or the sea surface, instead of using the pneumatic sensor. The distance measuring sensor may be of any type such as those using infrared rays, ultrasonic waves, a laser, and various other methods.

The memory 112 of the controller 110 stores a flight control program FCP, in which a flight control algorithm is described. This flight control algorithm is to control the posture and basic flight operation of the multi-copter M during a flight. In response to a command from the operator (operation terminal 171), the flight control program FCP adjusts the number of rotations and the rotational speed of each rotor R based on the current position obtained from the sensors and related devices. In this manner, the flight control program FCP corrects the posture and positional deviation of the airframe while causing the multi-copter M to fly. The multi-copter M may be manually operated by the operator using the operation terminal 171 or may be caused to make an autonomous flight to the destination. Before the autonomous flight (hereinafter referred to as "autopilot"), parameters associated with, for example, the latitude, longitude, altitude, and flight route are preset in the flight control program FCP.

On the bottom surface of the multi-copter M, an electrically powered winch 161 is attached with a wire 162 wound around the winch 161. The winch 161 (and the wire 162) is a device that suspends the underwater exploration unit I from the multi-copter M. With the winch 161, the multi-copter M is capable of carrying and dropping the underwater exploration unit I. The winch 161 is connected to a feeding line extending from the battery 180. The winch 161 is also connected to a signal line through which the winch 161 and the controller 110 are connected to each other. In response to a command from the controller 110, the winch 161 winds out or winds up the wire 162 or detaches the underwater exploration unit I from the wire 162.

To the leading end of the wire 162, an attachment 162a is attachably and detachably connected. The attachment 162a is connectable to the underwater exploration unit I. The winch 161 is capable of detaching the attachment 162a at any time. A method of detaching the attachment 162a from the winch 161 is not particularly limited. For example, one possible structure is that when the wire 162 is completely wound up into the winch 161, a connection lock between the wire 162 and the attachment 162a is mechanically released. Another possible structure is that a signal line is superimposed on the wire 162 so that the attachment 162a is detached electronically. In addition, the attachment 162a is not an essential component. For example, the wire 162 may be a disposable cord capable of supporting the weight of the underwater exploration unit I, and the winch 161 may detach the disposable cord to drop the underwater exploration unit I.

In this embodiment, the multi-copter M is employed, which is capable of flexibly changing its moving speed and direction. This facilitates dropping of the underwater vehicle 200 precisely to a survey point, and facilitates the work of collecting the underwater vehicle 200. "Unmanned aerial vehicle" according to the present invention, however, is not limited to a rotorcraft. It is also possible to employ a fixed-wing aerial vehicle as the unmanned aerial vehicle according to the present invention, insofar as the fixed-wing aerial vehicle is controllable by a skilled operator or through an autopilot with high precision.

[Configuration of Underwater Vehicle]

Figure 3:
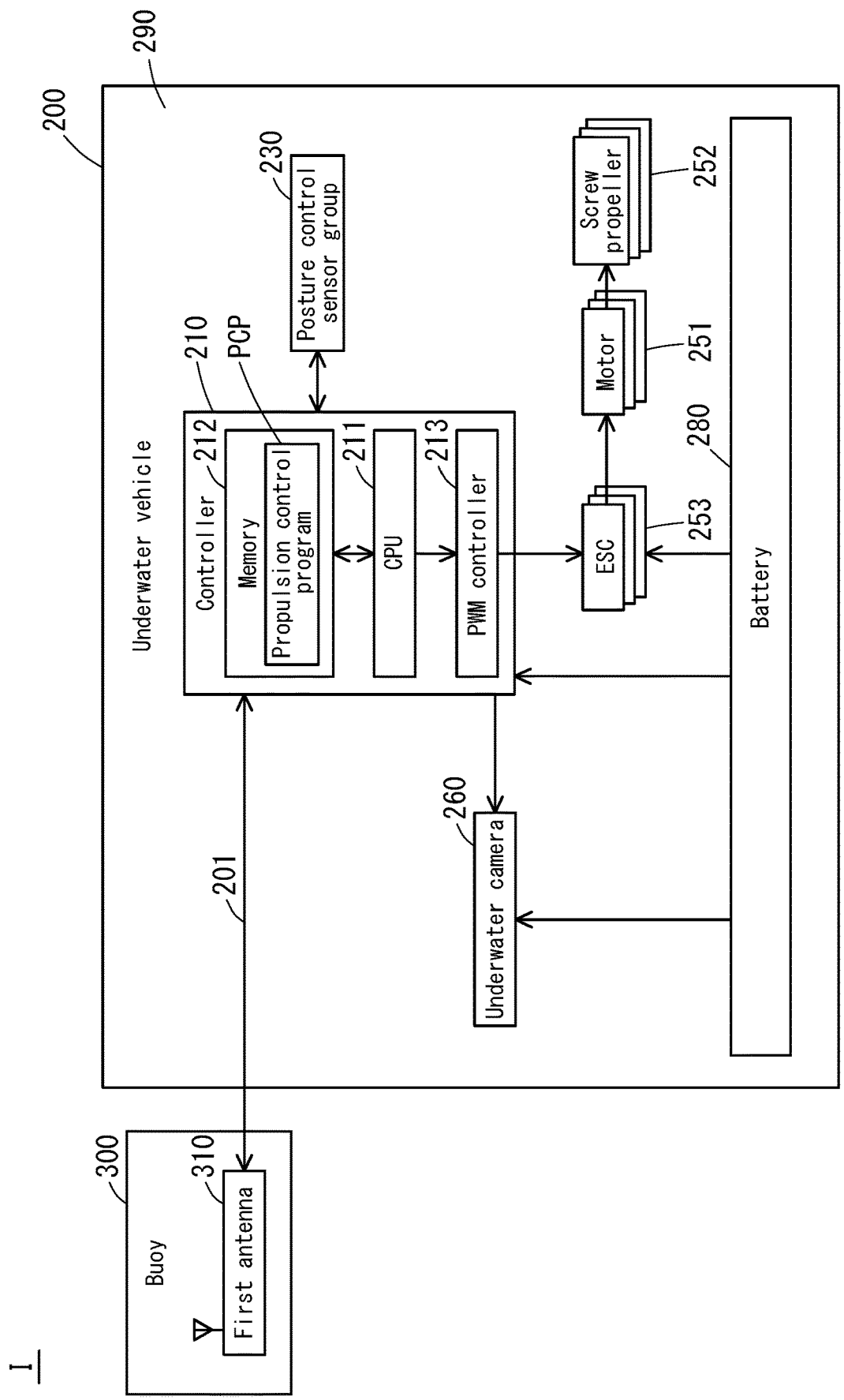
FIG. 3 is a block diagram illustrating a functional configuration of an underwater vehicle.

FIG. 3 is a block diagram illustrating a functional configuration of the underwater vehicle 200 according to this embodiment. The underwater vehicle 200 mainly includes: the underwater camera 260, which takes an image under the sea; a plurality of screw propellers 252, which serve as a source of thrust that propels the underwater vehicle 200 under the sea; a controller 210, which centrally manages the operation of each of the screw propellers 252 and the underwater camera 260; the signal line 201, which connects the controller 210 and the first antenna 310 to each other; and a battery 280, which supplies power to the foregoing components. The underwater camera 260, the plurality of screw propellers 252, the controller 210, the signal line 201, and the battery 280 are disposed in a housing 290.

The controller 210 of the underwater vehicle 200 includes: a CPU 211, which is a central processing unit; a memory 212, which is a storage device such as ROM and RAM; and a PWM controller 213, which controls the number of rotations and the rotational speed of each of motors 251 through ESCs 253.

The memory 212 of the controller 210 stores a propulsion control program PCP. The propulsion control program PCP controls the image-taking direction and basic traveling operation of the underwater vehicle 200 under the sea. In response to a command received from the command center C (second antenna 410) via the first antenna 310, the propulsion control program PCP moves the hull and/or changes the image-taking direction by adjusting the number of rotations and the rotational speed of each of the screw propellers 252. Further, the controller 210 transmits, in real time, an image taken by the underwater camera 260 to the second antenna 410 (command center C) via the first antenna 310.

The underwater vehicle 200 also includes a posture control sensor group 230, which includes an acceleration sensor and an angular velocity sensor. Based on information obtained from the posture control sensor group 230, the propulsion control program PCP automatically corrects a postural deviation of the underwater vehicle 200, keeping the underwater vehicle 200 directed in the image-taking direction specified by the command center C. It is noted that due to the nature of the underwater vehicle 200 according to this embodiment, which takes an image under the sea, the underwater vehicle 200 needs to stabilize its image-taking direction. Therefore, it is preferred that the underwater vehicle 200 include the posture control sensor group 230 and the above-described posture correction function. It is also possible to omit the posture control sensor group 230 and the above-described posture correction function under some conditions. Examples of the conditions include: when an image is taken in a lake where water is stationary and thus the posture of the underwater vehicle 200 is not significantly affected by its surrounding environment; when there is no particular problem for the operator to manually control the posture of the underwater vehicle 200 while checking, on the display device, an image transmitted from the underwater camera 260; and when the posture of the underwater vehicle 200 does not affect the quality of information that the underwater vehicle 200 collects.

The underwater vehicle 200 according to this embodiment is capable of not only changing its posture (image-taking direction) under the sea, but also traveling by itself to move the hull (move the image-taking position). Another possible example is that the underwater vehicle 200 is capable of changing only the image-taking direction, and that the multi-copter M carries the underwater vehicle 200 whenever the underwater vehicle 200 needs to move. Still another possible example is that an operation of the underwater vehicle 200 at a survey point is preset in the propulsion control program PCP and that the underwater vehicle 200 automatically performs a routine survey according to the propulsion control program PCP. Further, the underwater vehicle 200 according to this embodiment controls its posture and propulsion direction by adjusting the thrust of the plurality of screw propellers 252, similarly to the multi-copter M. It is also possible to use fixed screw propellers and a rudder to control propulsion of the underwater vehicle 200.

A mission of the underwater vehicle 200 according to this embodiment is to take an image under the sea at a survey point and transmit the image data to the command center C. The information collected by the underwater vehicle 200 at the survey point is not limited to the image data; other information may be collected insofar as the information is detectable by the sensors and related devices. Further, the underwater vehicle 200 according to this embodiment is capable of traveling independently of the buoy 300 within the line length of the signal line 201. Another possible example is that the underwater vehicle 200 is integral to the buoy 300 and takes an image under the sea from the sea surface.

[Configuration of Buoy]

The buoy 300 has a bag-shaped body that inflates when gas is filled into the buoy 300 and that uses its buoyancy to float on the sea surface. Before being dropped onto the sea surface, the buoy 300 is in uninflated state, not filled with gas. In this state, the buoy 300 is folded with the underwater vehicle 200 wrapped inside the buoy 300. Together with the underwater vehicle 200, the buoy 300 is carried to the survey point at sea by the multi-copter M. When the buoy 300 is dropped and lands on the sea surface, gas automatically fills the buoy 300, causing the buoy 300 to inflate. The buoy 300 wrapping the underwater vehicle 200 acts as a shock absorber for the underwater vehicle 200 when the underwater exploration unit I lands on water. If necessary, it is possible to provide another shock absorber between the folded buoy 300 and the underwater vehicle 200 wrapped inside the buoy 300.

A known automatic inflation mechanism may be used as a mechanism for inflating the buoy 300 upon landing on water. One possible structure is that a lock mechanism of a gas cylinder filled with liquefied gas (such as carbon dioxide gas and mixed gas of carbon dioxide gas and nitrogen gas) is made of a part dissolvable in water or another liquid so that the part is dissolved upon landing on the sea surface, causing the lock mechanism to be released and the gas to fill the bag-shaped body. Another possible structure is that a sensor capable of detecting being wet is used to electronically release the lock mechanism of the gas cylinder.

The outer shape of the inflated buoy 300 according to this embodiment is a flat sphere. Therefore, upon inflation of the buoy 300 on the sea surface, even if the underwater vehicle 200 is on top of the buoy 300, the underwater vehicle 200 cannot maintain its stability on the buoy 300 and falls into the sea. Once the underwater vehicle 200 falls into the sea, the underwater vehicle 200 pulls the buoy 300 through the signal line 201 by the weight of the underwater vehicle 200 itself, restoring the top and bottom surfaces of the buoy 300 to their proper positions. This stabilizes the positions of the top and bottom surfaces of the floating buoy 300, and ensures that the first antenna 310 supported by the buoy 300 is placed above the sea surface at all times.

It is noted that "floating member" according to the present invention is not limited to the configuration of the buoy 300; any other floating member is possible insofar as the floating member is capable of floating on the water surface while supporting the first antenna 310. In particular, the automatic inflation mechanism of the buoy 300 is not an essential configuration. It is also possible to use an inherently inflated floating member, insofar as the use of the inherently inflated floating member causes no disruption while the floating member is being loaded onto or being carried by the multi-copter M.

[Structure of First Antenna]

The first antenna 310 has a bar-shaped body with its base end coupled to the buoy 300. While the buoy 300 is afloat, the first antenna 310 stands upward. The first antenna 310 according to this embodiment is not provided with a mechanism that enables adjustment of the angle in a circumferential direction of the first antenna 310. Therefore, a non-directional antenna is used as the first antenna 310. The first antenna 310 may be of any other type insofar as the antenna is capable of stably transmitting and receiving wireless signals to and from the command center C.

From the outer periphery of the first antenna 310, a hook 311, which is irrelevant to transmission and reception of radio waves, extends in horizontal directions. The hook 311 and the attachment 162a of the wire 162 of the multi-copter M are engageable with each other, so that the multi-copter M is able to lift the underwater exploration unit I. To make this lift possible, the first antenna 310 (and the hook 311) according to this embodiment has a strength high enough to support the weight of the underwater exploration unit I.

[Structure of Command Center (Second Antenna)]

The command center C is a facility that includes the second antenna 410, which is capable of transmitting and receiving wireless signals to and from the first antenna 310. Through wireless communication via the first antenna 310, the command center C transmits an operation command to the underwater vehicle 200, while receiving data of a moving image and/or a still image under the sea taken by the underwater camera 260 of the underwater vehicle 200. Then, the command center C displays the received data on the display device, not illustrated.

The second antenna 410 according to this embodiment is a directional antenna capable of adjusting the direction in which radio waves are radiated. This antenna, however, is not intended in a limiting sense; the second antenna 410 may be of any other type insofar as the antenna is capable of stably transmitting and receiving wireless signals to and from the first antenna 310.

[Configuration of Collection Pool]

The collection pool P is a water tank in which water is stored. The underwater exploration unit I collected by the multi-copter M is dropped into the collection pool P. The water stored in the collection pool P acts as a shock-absorber for the underwater exploration unit I when the underwater exploration unit I is dropped, ensuring that the underwater exploration unit I is collected more safely. "Shock-absorbing facility" according to the present invention is not limited to the configuration of the collection pool P and may be of another configuration such as an air cushion. In addition, the shock-absorbing facility according to the present invention is not an essential configuration. It is also possible to simply reduce the descending speed of the multi-copter M at the command center C so that the collected underwater vehicle 200 slowly lands on the ground.

[Carriage and Collection Operations]

By referring to FIGS. 4 to 7, description will be made below with regard to an operation of the multi-copter M carrying the underwater exploration unit I to a survey point and dropping the underwater exploration unit I to the survey point, and an operation of the multi-copter M collecting the underwater exploration unit I after the underwater exploration unit I has finished a survey.

Figure 4:
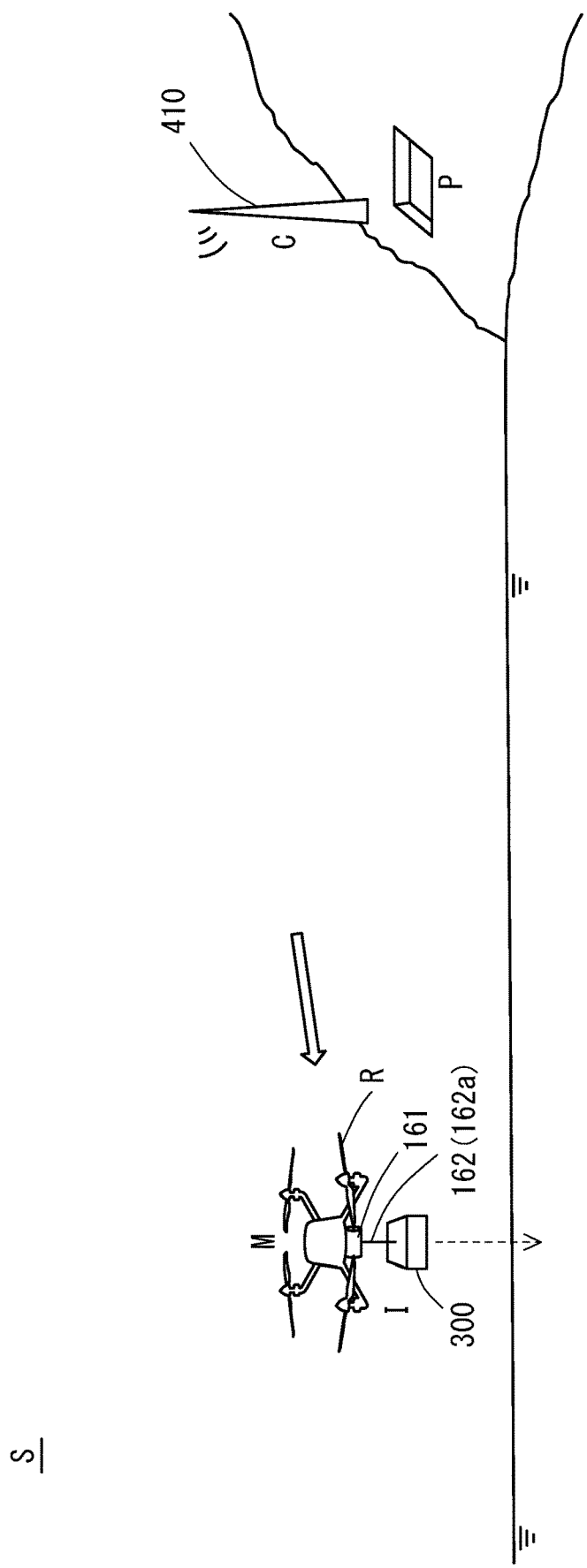
FIG. 4 is a schematic diagram illustrating the multi-copter that is carrying an underwater exploration unit to a survey point and that is dropping the underwater exploration unit to the survey point.

FIG. 4 is a schematic diagram illustrating the multi-copter M that is carrying the underwater exploration unit I to the survey point and that is dropping the underwater exploration unit I to the survey point. Before the underwater exploration unit I is dropped to the survey point, the buoy 300 is in uninflated state with the underwater vehicle 200 wrapped inside the buoy 300, and the first antenna 310 is also laid inside the buoy 300. At this point of time, the underwater vehicle 200 is not activated, and thus the first antenna 310 is in incommunicable state.

Before being dropped, the underwater exploration unit I according to this embodiment is folded into a small volume, facilitating loading of the underwater exploration unit I onto the multi-copter M and carriage of the underwater exploration unit I. Moreover, the first antenna 310 is kept in incommunicable state until the underwater exploration unit I lands on the sea surface. This prevents the underwater vehicle 200 from erroneously operating during carriage of the underwater vehicle 200. It is noted that there is no particular limitation to the method of activating the underwater vehicle 200 (first antenna 310) after the underwater exploration unit I is dropped. For example, one possible method is to use a normally-open push-button that electrifies the underwater vehicle 200 when the underwater vehicle 200 is released from the buoy 300. Another possible method is to start electrifying the underwater vehicle 200 upon detecting that the underwater vehicle 200 has landed on water (the method of detecting the water landing is similar to the method used in the above-described automatic inflation mechanism of the buoy 300). Still another possible method is to activate the underwater vehicle 200 by using a timer. If there are no problems in erroneous operation of the underwater vehicle 200 and/or a waste of the battery 280 during carriage, it is naturally possible to activate the underwater vehicle 200 (first antenna 310) in advance, as early as when the underwater exploration unit I is loaded onto the multi-copter M.

First, in conducting a survey, the underwater exploration unit I is manually connected to the attachment 162a of the wire 162 at the command center C. Subsequently, the multi-copter M is caused to fly to a survey point by autopilot (or by manual operation using the operation terminal 171, not illustrated). When the multi-copter M arrives at a spot in the air vertically above the survey point, the multi-copter M is caused to hover at the spot and lower the altitude of the multi-copter M within a range safe enough that the multi-copter M is out of touch with the sea surface. After the multi-copter M has descended to a predetermined altitude, the multi-copter M detaches the attachment 162a automatically (or manually using the operation terminal 171). This causes the underwater exploration unit I to be dropped onto the sea surface.

Figure 5:
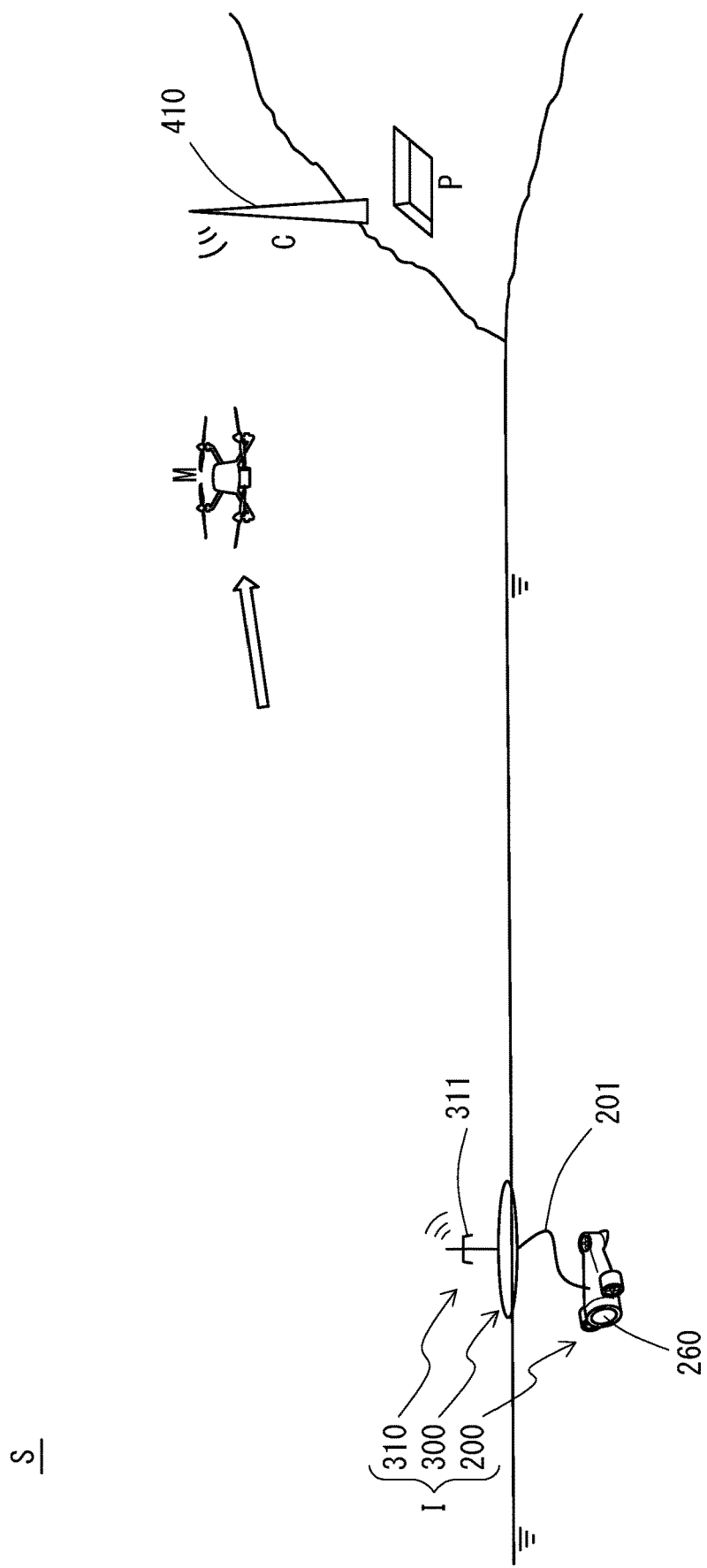
FIG. 5 is a schematic diagram illustrating the multi-copter that is returning to a command center after finishing dropping the underwater exploration unit.

FIG. 5 is a schematic diagram illustrating the multi-copter M that is returning to the command center C after finishing dropping the underwater exploration unit I. After dropping the underwater exploration unit I, the multi-copter M returns to the command center C by autopilot (or by manual operation using the operation terminal 171).

After the underwater exploration unit I is dropped onto the sea surface, the buoy 300 automatically inflates, causing the underwater vehicle 200 to be submerged under the sea and the first antenna 310 to stand upward. Meanwhile, the underwater vehicle 200 is activated and the first antenna 310 turns into communicable state.

Figure 6:
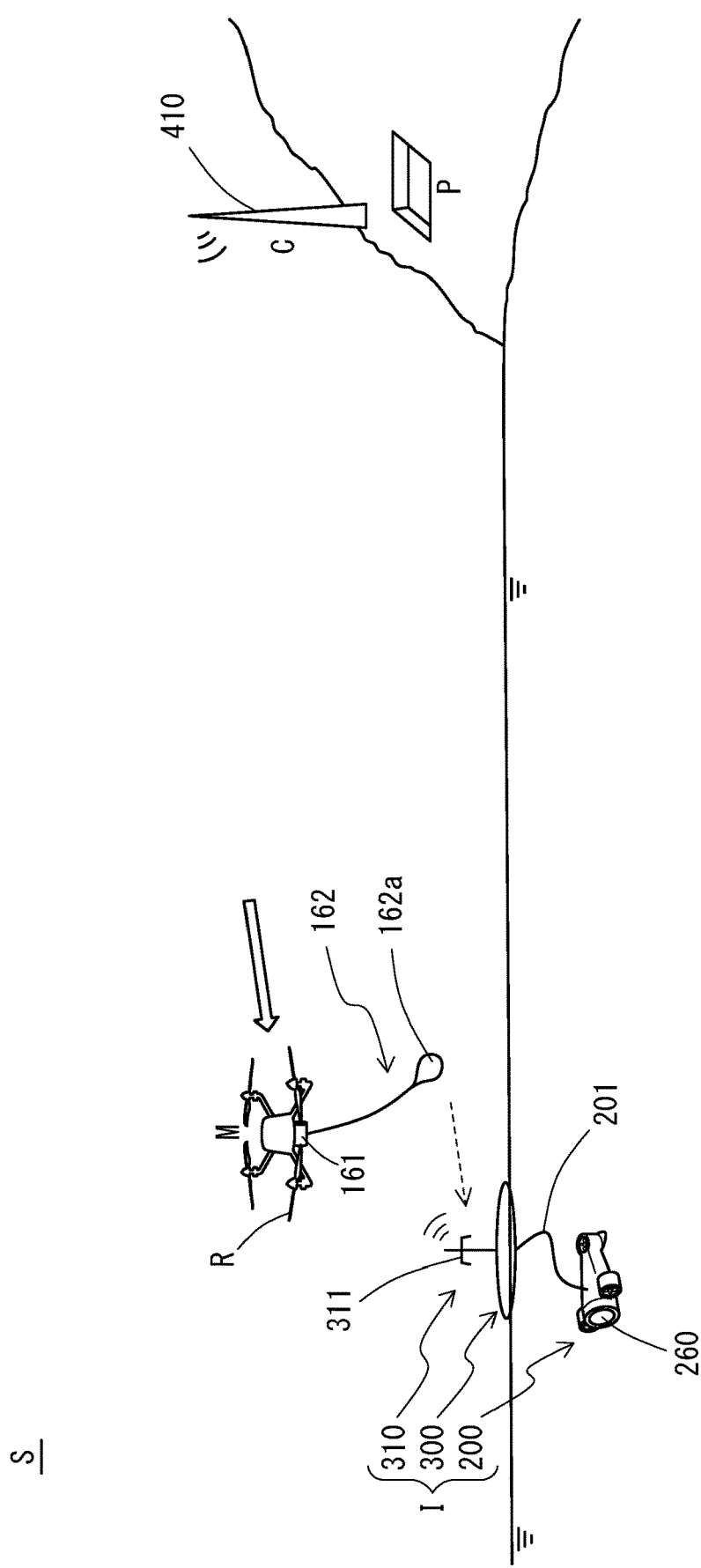
FIG. 6 is a schematic diagram illustrating the multi-copter that is heading to collect the underwater exploration unit after the underwater exploration unit has finished a survey.

FIG. 6 is a schematic diagram illustrating the multi-copter M that is heading to collect the underwater exploration unit I after the underwater exploration unit I has finished the survey. First, in collection of the underwater exploration unit I, the attachment 162a for collecting the underwater exploration unit I is manually attached to the multi-copter M at the command center C. Subsequently, the multi-copter M is caused to fly to the survey point by autopilot (or by manual operation using the operation terminal 171). When the multi-copter M has come close to the survey point, the multi-copter M lowers the attachment 162a to the altitude of the hook 311 of the first antenna 310.

When the distance between the command center C and the survey point is small, it is possible to engage the attachment 162a and the hook 311 with each other by manual operation with visual observation. When the distance between the command center C and the survey point is large, the command center C and the multi-copter M may be provided with an FPV (First Person View) system. Using the FPV, it is possible to engage the attachment 162a and the hook 311 with each other by manual operation while visually checking a moving image taken from above by a camera of the multi-copter M.

Alternatively, it is possible to automate collection of the underwater exploration unit I by providing the underwater exploration unit I with means for transmitting current position information. For example, a possible configuration is that a GPS receiver is disposed on the first antenna 310 or the buoy 300, and that the current position information obtained from the GPS receiver is transmitted from the first antenna 310 to the command center C. Then, the current position information received by the command center C is transferred to the multi-copter M through the operation terminal 171. Then, the multi-copter M automatically engages the attachment 162a and the hook 311 with each other while monitoring the current position of the underwater exploration unit I based on the current position information. It is noted that the above-described current position information may be directly transmitted from the underwater exploration unit I to the multi-copter M. For another example, it is also possible to identify the current position of the underwater exploration unit I by arranging a high-intensity light source that flashes at 15 fps or less on the first antenna 310 or the buoy 300, and by causing a visible light camera mounted on the multi-copter M to take an image of the flashing high-intensity light source. For still another example, it is possible to operate a flashing pattern of the above-described light source into a form similar to a Morse code and to transmit information to the multi-copter M and/or the command center C at approximately 15 bps. This kind of communication function is considered to be effective in, for example, identifying one underwater exploration unit I to be collected from a plurality of underwater exploration units I.

Figure 7:
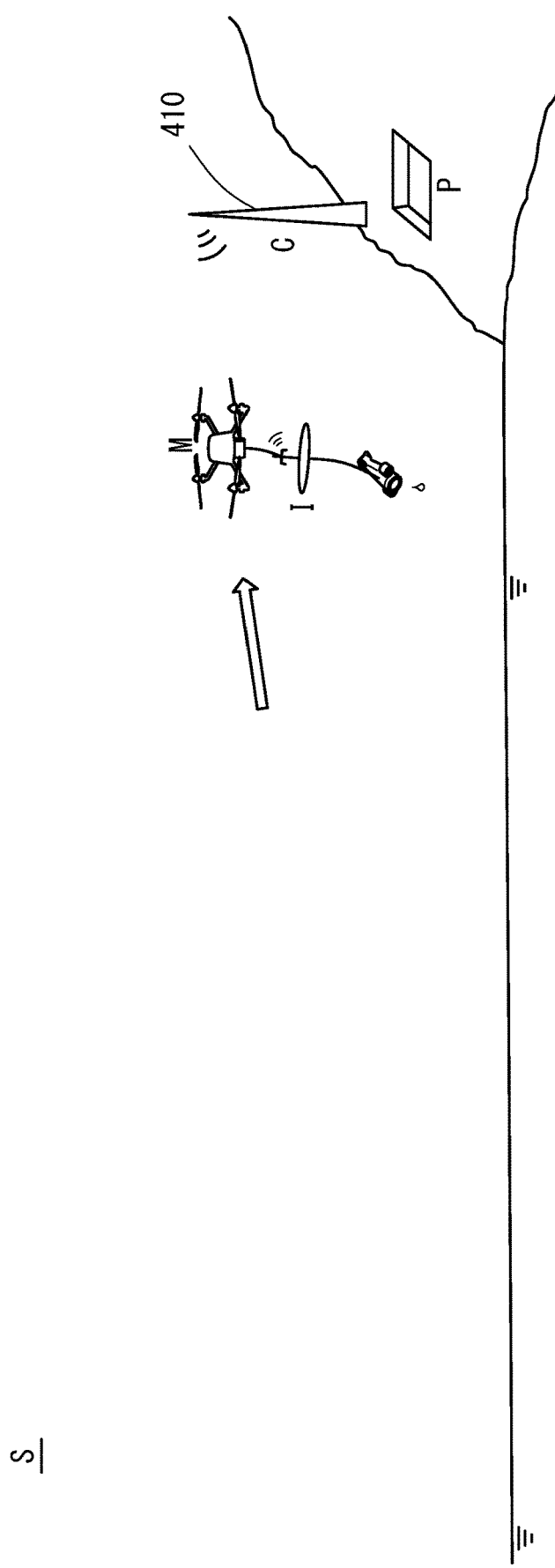
FIG. 7 is a schematic diagram illustrating the multi-copter that is heading for a collection pool after capturing the underwater exploration unit.

FIG. 7 is a schematic diagram illustrating the multi-copter M that is flying to the collection pool P after capturing the underwater exploration unit I. After successfully engaging the attachment 162a and the hook 311 with each other, the multi-copter M winds up the wire 162, and heads for the collection pool P by autopilot (or by manual operation using the operation terminal 171) with the underwater exploration unit I suspended from the multi-copter M. If, at this time, the multi-copter M is still halfway through the survey and intends to change survey points, the multi-copter M heads for the next survey point, instead of heading for the collection pool P. In the underwater exploration unit I according to this embodiment, the first antenna 310 has a strength high enough to support the weight of the underwater exploration unit I. This configuration ensures that the underwater exploration unit I is collected using the method described above. It is noted that for example, if the underwater vehicle 200 has a mechanism for winding up the signal line 201, it is preferable that the underwater vehicle 200 wind up the signal line 201 before the underwater exploration unit I is collected.

When the multi-copter M arrives at a spot in the air vertically above the collection pool P, the multi-copter M hovers at the spot and descends to such an altitude that the underwater vehicle 200 sinks in the collection pool P. Subsequently, the multi-copter M detaches the attachment 162a from the wire 162 automatically (or manually using the operation terminal 171), causing the underwater exploration unit I to be dropped into the collection pool P. When the underwater vehicle 200 dropped into the collection pool P is pulled up from the collection pool P, the underwater vehicle 200 may be operated to an edge of the collection pool P or may be collected to the edge of the collection pool P by simply using a tool such as a stick.

After dropping the underwater exploration unit I into the collection pool P, the multi-copter M returns to the command center C by autopilot (or by manual operation using the operation terminal 171).

An embodiment of the present invention has been described hereinbefore. The present invention, however, will not be limited to the above-described embodiment but may have various modifications without departing from the scope of the present invention.

The invention claimed is:

1. An underwater exploration system comprising:
an underwater exploration unit comprising:
  a floating member comprising a first antenna and configured to support the first antenna above a water surface; and
  an underwater vehicle connected to the first antenna via a signal line;
a communication device comprising a second antenna configured to transmit and receive a wireless signal to and from the first antenna; and
an unmanned aerial vehicle configured to carry the underwater exploration unit and drop the underwater exploration unit to the water surface,
wherein the unmanned aerial vehicle is configured to hang a collection member from an airframe of the unmanned aerial vehicle, the collection member being configured to collect the dropped underwater exploration unit, and
wherein the unmanned aerial vehicle is configured to engage the collection member with a part of the dropped underwater exploration unit to lift the underwater exploration unit, the part being above the water surface.

2. The underwater exploration system according to claim 1, wherein the unmanned aerial vehicle comprises
a plurality of propellers, and
a controller configured to control a flight that is made using the plurality of propellers.

3. The underwater exploration system according to claim 1, wherein the floating member is configured to inflate upon landing on water, turning the first antenna into a communicable state.

4. The underwater exploration system according to claim 3, wherein before the floating member inflates, the floating member is in a folded state with the underwater vehicle wrapped inside the floating member.

5. The underwater exploration system according to claim 1,
wherein after the underwater exploration unit lands on water, the first antenna stands upward from the floating member,
wherein the collection is configured to capture the first antenna, and
wherein the first antenna has a strength high enough to support a weight of the underwater exploration unit.

6. The underwater exploration system according to claim 1,
wherein the underwater exploration unit comprises means for transmitting current position information on the underwater exploration unit, and
wherein the unmanned aerial vehicle is configured to automatically approach the underwater exploration unit based on the current position information.

7. An underwater exploration system comprising:
an underwater exploration unit comprising:
  a floating member comprising a first antenna and configured to support the first antenna above a water surface; and
  an underwater vehicle connected to the first antenna via a signal line;
a communication device comprising a second antenna configured to transmit and receive a wireless signal to and from the first antenna;
an unmanned aerial vehicle configured to carry the underwater exploration unit, drop the underwater exploration unit to the water surface, and collect the dropped underwater exploration unit; and
a shock-absorbing facility to which the underwater exploration unit collected by the unmanned aerial vehicle is dropped, wherein the shock-absorbing facility comprises a water tank in which water is stored.

8. The underwater exploration system according to claim 2, wherein the floating member is configured to inflate upon landing on water, turning the first antenna into a communicable state.

9. The underwater exploration system according to claim 8, wherein before the floating member inflates, the floating member is in a folded state with the underwater vehicle wrapped inside the floating member.

10. The underwater exploration system according to claim 2,
   wherein after the underwater exploration unit lands on water, the first antenna stands upward from the floating member,
   wherein the collection is configured to capture the first antenna, and
   wherein the first antenna has a strength high enough to support a weight of the underwater exploration unit.

11. The underwater exploration system according to claim 2,
   wherein the underwater exploration unit comprises means for transmitting current position information on the underwater exploration unit, and
   wherein the unmanned aerial vehicle is configured to automatically approach the underwater exploration unit based on the current position information.

* * * * *